Feb. 3, 1970  C. JOHNSON  3,492,865
FORCE MEASURING INSTRUMENT
Filed July 7, 1967  5 Sheets-Sheet 1
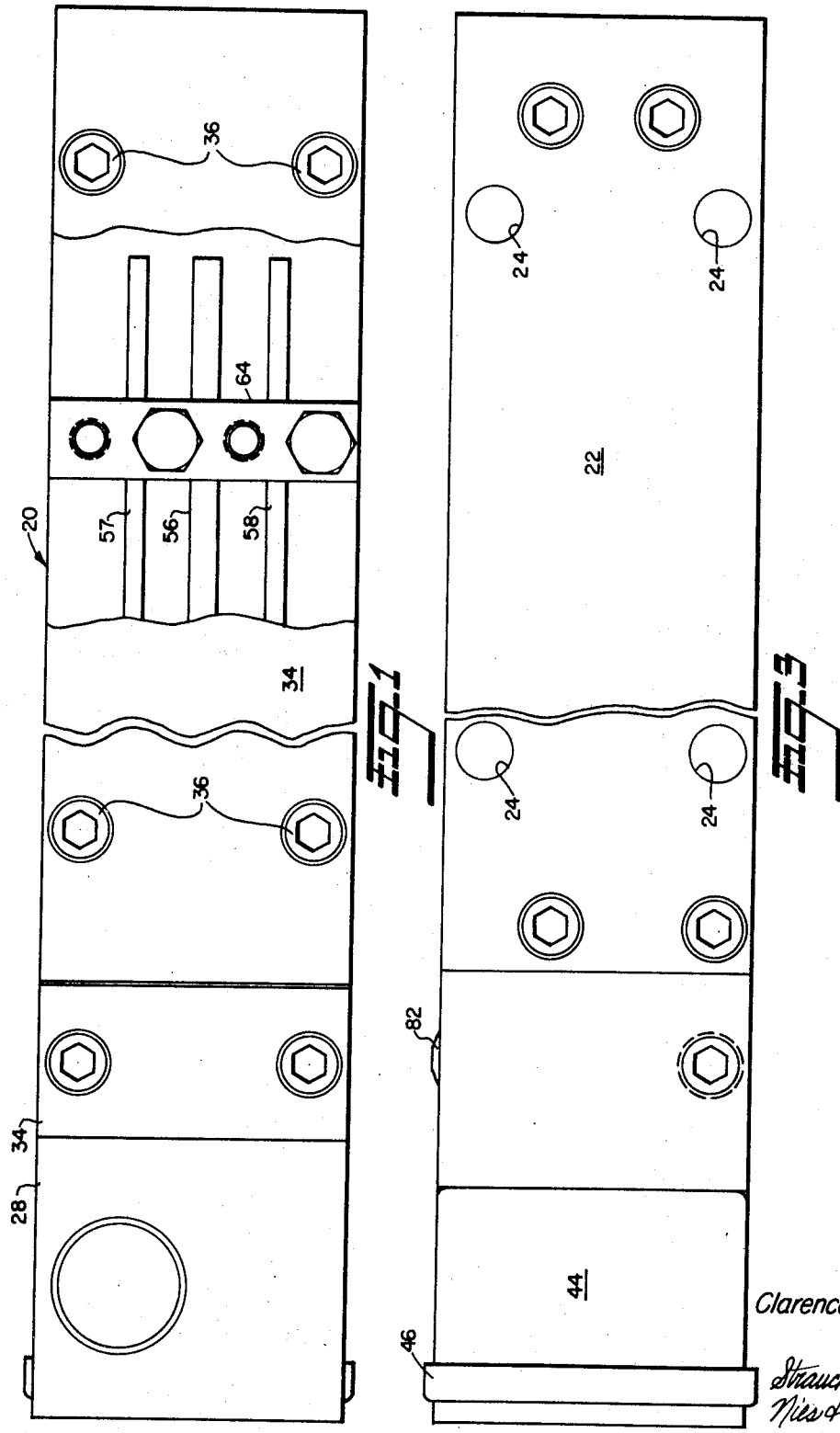
INVENTOR
Clarence Johnson
ATTORNEYS

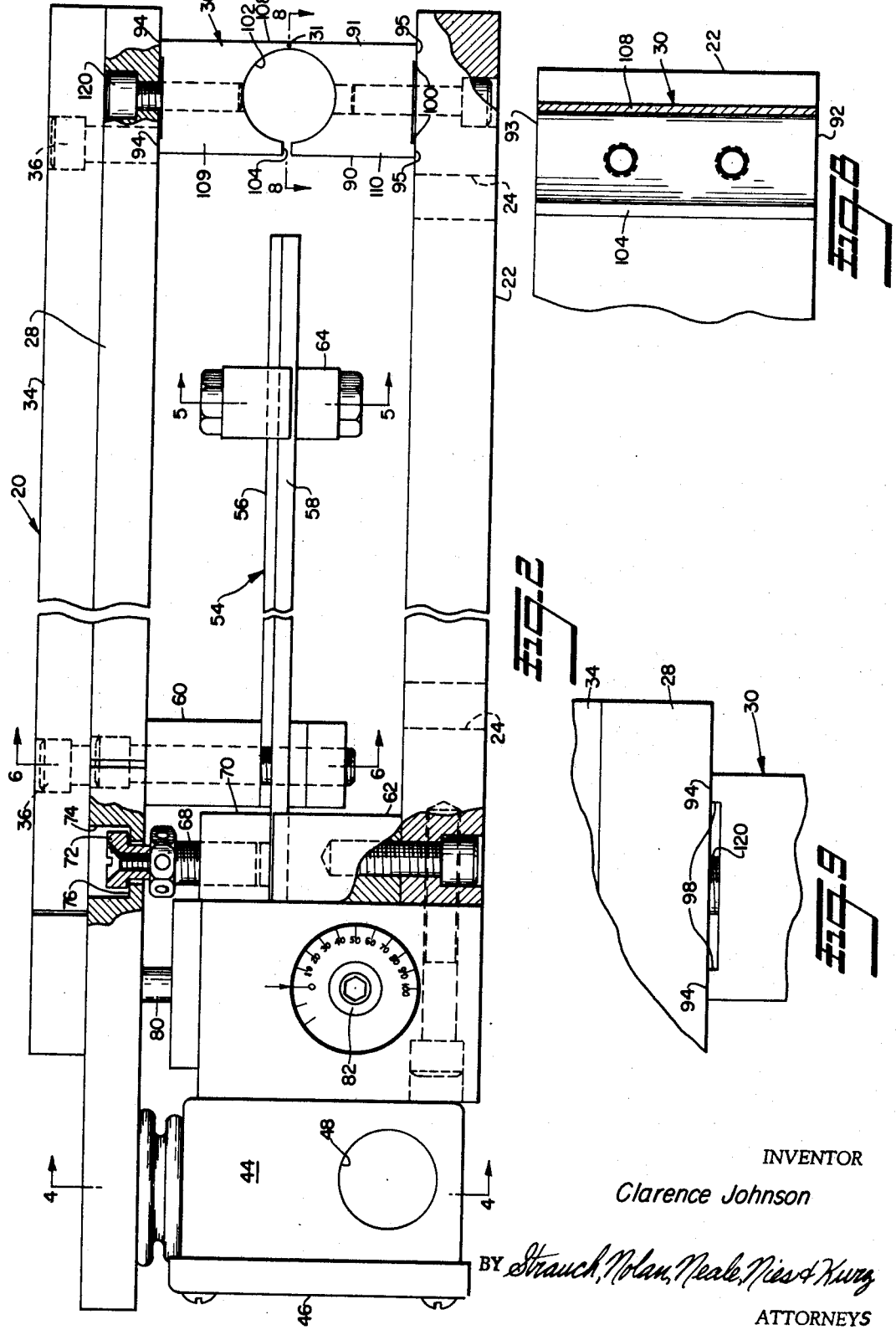

Feb. 3, 1970  C. JOHNSON  3,492,865
FORCE MEASURING INSTRUMENT
Filed July 7, 1967  5 Sheets-Sheet 3

INVENTOR
Clarence Johnson
BY Strauch, Nolan, Neale, Nies & Kurz
ATTORNEYS

Feb. 3, 1970  C. JOHNSON  3,492,865
FORCE MEASURING INSTRUMENT
Filed July 7, 1967  5 Sheets-Sheet 4
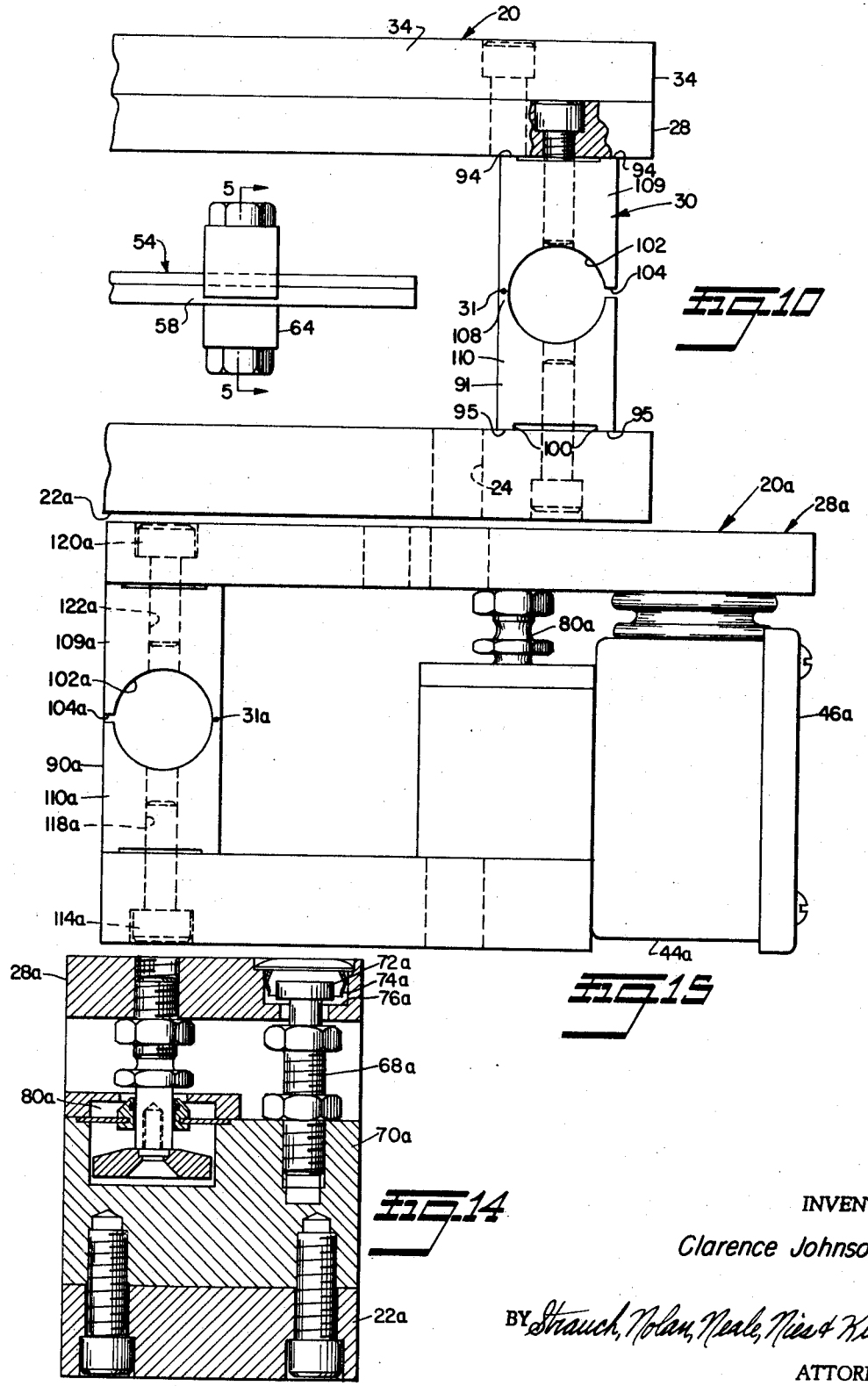
INVENTOR
*Clarence Johnson*
BY *Strauch, Nolan, Neale, Nies & Kurz*
ATTORNEYS

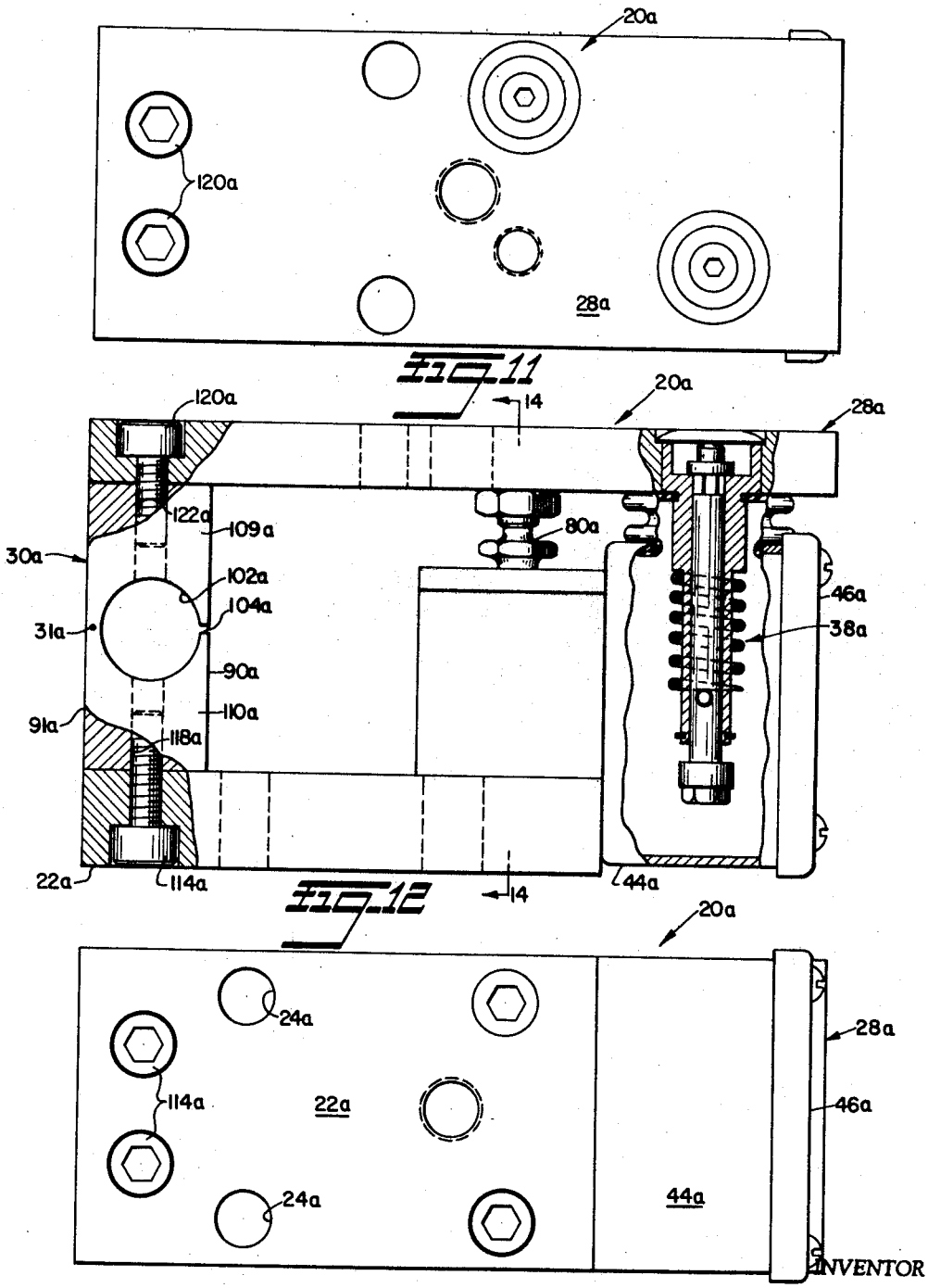

United States Patent Office 3,492,865
Patented Feb. 3, 1970

1

3,492,865
FORCE MEASURING INSTRUMENT
Clarence Johnson, 31649 Trillium Trail, Pepper Pike,
Cleveland, Ohio 44124
Continuation-in-part of applications Ser. No. 498,156,
Oct. 7, 1965, and Ser. No. 472,978, July 19, 1965.
This application July 7, 1967, Ser. No. 651,882
Int. Cl. G01l 5/12
U.S. Cl. 73—141    5 Claims

ABSTRACT OF THE DISCLOSURE

The force measuring instrument disclosed herein comprises a force receiving platform yieldably, pivotally mounted on a support base by a generally C-shaped flexure hinge member which is formed with a through bore and a slot opening radially into the bore to provide (a) a relatively thin flexure spring section on the side of the bore opposite from the slot and (b) opposed relatively rigid sections respectively fixed to the platform and base and being integrally joined together only through the spring section.

RELATED APPLICATIONS

This application is a continuation-in-part of my copending application Ser. No. 498,156 filed Oct. 7, 1965, now Patent No. 3,354,710, for Force Measuring Instruments and a continuation-in-part of my copending application Ser. No. 472,978 filed on July 19, 1965, now Patent No. 3,358,502, for Force Measuring Instrument.

Field of invention

This invention relates to force measuring instruments and especially to transducers which are capable of continuously measuring mechanically applied forces, weight, tension, and other measurable quantities or converting a mechanical force into another force of energy such as an electrical signal.

BACKGROUND

Typically, force transducers of the type with which the present invention is especially concerned comprise a load supporting platform which is swingably mounted on a fixed base by a flexure pivot connection. In the past, this pivot connection was made up of a considerable number of parts including a flexure plate, at least two support blocks, suitable clamping plates for securing the flexure plate to the support blocks, and a considerable number of bolts and locating pins for clamping the flexure plate to the blocks and also for mounting the blocks on the force receiving platform and support base.

SUMMARY OF INVENTION AND OBJECTS

To simplify the pivot connection construction, the present invention contemplates a novel flexure hinge member for yieldably supporting the load receiving platform on the support base. The hinge member of this invention is generally C-shaped having a transverse, through bore and a slot opening radially into the bore to provide a relatively thin flexure spring section on the side of the bore opposite from the slot and a pair of opposed relatively rigid sections which are adapted to respectively be fixed to the platform and the base. This novel construction minimizes the number of parts needed to provide the pivot connection between the force receiving platform and the support base, thus reducing costs of manufacture. The novel hinge connection member of this invention is furthermore adapted to be mounted alternatively in reversely oriented, 180° spaced apart positions for selectively varying the length of the lever arm distance between the pivot axis of the platform and the point at which a

2 motion transmitting linkage is connected to the platform for transmitting the pivotal deflection of the platform to a suitable utilization device.

Accordingly, it is a major object of this invention to provide a novel force measuring instrument having a simplified pivot connection for yieldably mounting a load receiving platform on a support base.

More specifically, it is the object of this invention to provide for a novel force measuring instrument having a generally C-shaped flexure hinge member for mounting the platform on the base and having a transverse through bore and a slot opening radially into the bore to form a thin flexure section diametrically opposite the slot and also to form opposed relatively rigid sections which are integrally joined through the flexure section and which are respectively fixed to the platform and the base.

Still another object of this invention is to provide a novel force measuring instrument having a simplified flexure member for pivotally supporting a force receiving platform on a support base and being mountable in reversely oriented, 180° spaced apart positions to alter the sensitivity of the instrument by varying the effective lever arm distance of the platform for transmitting the pivotal movement of the platform to a utilization device.

Further objects of this invention will appear as the description proceeds in connection with the appended claims and annexed drawings wherein:

FIGURE 1 is a top plan view illustrating one embodiment of this invention with the force receiving platform partially broken away to show the construction more clearly;

FIGURE 2 is a partially sectioned side elevation of the force measuring instrument shown in FIGURE 1;

FIGURE 3 is a bottom plan view of the force measuring instrument shown in FIGURE 1;

FIGURE 8 is a section taken substantially along lines 8—8 of FIGURE 2;

FIGURE 9 is an enlarged fragmentary side elevation illustrating the upper portion of the spring hinge member seated against the force receiving platform as shown in FIGURE 2;

FIGURE 10 is a fragmentary side elevation similar to FIGURE 2, but showing the spring hinge member turned to its alternate, reversely oriented position spaced 180° from the position shown in FIGURE 2;

FIGURE 11 is a top plan view of another embodiment of this invention;

FIGURE 12 is a partially sectioned side elevation of the force measuring instrument illustrated in FIGURE 11;

FIGURE 13 is a bottom plan view of the force measuring instrument shown in FIGURES 11 and 12;

FIGURE 14 is a section taken substantially along lines 14—14 of FIGURE 12; and

FIGURE 15 is a fragmentary side elevation similar to FIGURE 12, but showing the flexure hinge member reversely positioned to alter the effective motion transmitting lever arm length along the force receiving platform.

Figure 4:
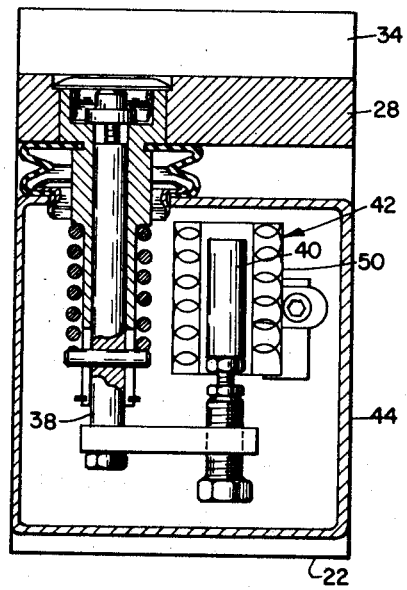
FIGURE 4 is a section taken substantially along lines 4—4 of FIGURE 2.
Figure 5:
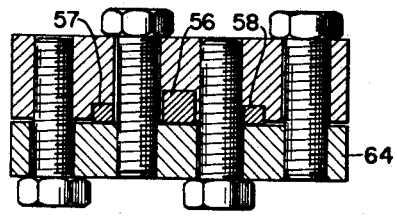
FIGURE 5 is a section taken substantially along lines 5—5 of FIGURE 2.

Referring now to the drawings, and more particularly to FIGURES 1–3, the reference numeral 20 designates a force measuring instrument constructed according to one embodiment of this invention and comprising a rigid rectangular base 22 which constitutes a support frame for the operating components of the instrument. Base 22, which preferably is of adequate thickness to provide a rigid, fixed support, is formed with parallel, laterally spaced apart through bores 24 which are adapted to receive unshown mounting bolts for securing the instrument in a fixed, operative position. Base 22 may be mounted in any position since the functioning parts of the instrument are so constructed and arranged so as to operate irrespective of the position in which base 22 is supported. Thus, base 22 may be mounted at any angle, either completely upside-down or at any oblique angle by utilizing the proper securing means.

As shown in FIGURE 2, a force-receiving platform 28, comprising a relatively thick, flat-sided, rectangular shaped plate, is supported on base 22 by a generally C-shaped flexure hinge support member 30. In the position of parts shown in the drawings, platform 28 is disposed vertically above and overlies base 22 and has a bottom surface facing the top flat surface of base 22. Member 30, which will be described fully later on, yieldably supports the platform 28 for pivotal motion about a transverse axis 31 (see FIGURE 2) extending laterally between the opposed faces of base 22 and platform 28.

As shown in FIGURES 1 and 2, a flat-sided adaptor plate 34 is secured by screws 36 to platform 28. Adaptor plate 34 may support a pillow block journalling a roller, for example, which could support a run of a conveyor belt, the tension of which is to be measured. It will be appreciated that any other means of transmitting a force to platform 28 may be employed depending upon the use desired to be made of the force measuring instrument of this invention. For example, strain gauges, air gauges, and other devices may be connected to platform 28 for data transmission purposes.

Still referring to FIGURE 2, platform 28 extends forwardly from the pivot connection provided by hinge member 30 to a region disposed beyond the forward end of base 22. In this embodiment, the forward deflectible end of platform 28 is connected by a motion transmitting linkage 38 (see FIGURE 4) to an armature core 40 of a differential transformer 42 which is operative to convert the pivotal displacement of platform 28 into an electrical signal that may be transmitted to a suitable indicator, recorder, controller, or other form of utilization device. Transformer 42 and linkage 38 are contained in a conduit box 44 which is provided with a detachable, gasketed cover plate 46 and which is fixed to the forward end of base 22 by any suitable means. The side walls of box 44 are provided with apertures 48 (one shown in FIGURE 2) for receiving suitable electrical conductor fittings (not shown) through which unshown leads may extend for connection to the terminals of the transformer winding. Linkage 38, transformer 42, and conduit box 44 are of the same construction as that described in the aforesaid copending application Ser. No. 472,978. Reference is made to this application in the event that further details of the linkage, transformer, and conduit box are required for a complete understanding of this invention.

The pivotal deflection of platform 28 about axis 31 is transmitted by linkage 38 to axially displace the armature core 40 for varying the magnitude of an electrical output signal at the terminals of the transformer winding which is indicated at 50 in FIGURE 4.

Figure 6:
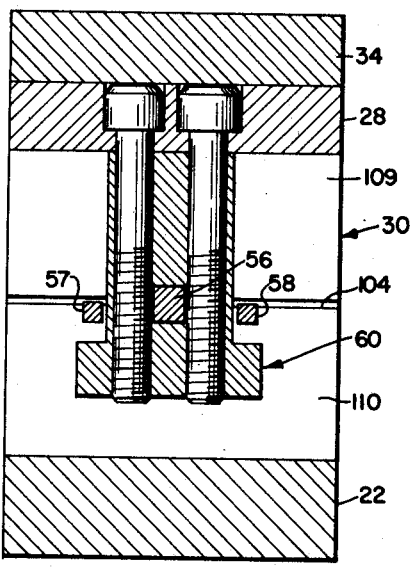
FIGURE 6 is a section taken substantially along lines 6—6 of FIGURE 2.

As shown in FIGURES 1, 2, 5 and 6, a range adjustment cantilever spring assembly 54 reacts against base 22 to resiliently resist pivotal displacement of platform 28 by forces applied thereto. Spring assembly 54 comprises a center leaf spring 56 extending along the longitudinal axis of the instrument between and in parallel spaced apart relation to a pair of side leaf springs 57 and 58. Spring 56, as best shown in FIGURE 6, is fixedly secured in cantilever fashion at its left-hand end to platform 28 by a clamping block and bolt assembly 60. Springs 57 and 58 are fixedly secured in cantilever fashion at their corresponding, left-hand ends to base 22 by further clamp and support block assembly 62 (see FIGURE 2). The corresponding, right-hand free ends of springs 56–58 are rigidly clamped together at a region spaced from the cantilever clamping positions to platform 28 and base 22 by an adjustable clamping plate assembly 64. With this construction, flexing forces applied to platform 28 are transmitted first through spring 56 and then in parallel relation through springs 57 and 58. The lonigtudinal flexure axes of springs 56–58 are contained in essentially parallel spaced-apart planes normally intersecting pivot axis 31. In their unflexed position shown in the drawings, the longitudinal axes of springs 56–58 are contained in a common plane extending about midway between platform 28 and base 22 and essentially containing the pivot axis 31. This form of range adjustment spring assembly and its relationship to the pivot axis is considerably advantageous as explained in detail in the aforesaid copending application Ser. No. 472,978. Reference is made to application Ser. No. 472,978 in the event further details are needed for a complete understanding of this invention. The range of instrument 20 is adjusted by shifting assembly 64 to vary the effective lever arm lengths of springs 56–58.

As best shown in FIGURE 2, a machine screw 68 is threaded into a block 70 which is fixed to base 22. The head of screw 68 is disposed vertically below platform 28 to limit downward displacement of the platform about pivot axis 31. Screw 68 is formed with a coaxial tapped bore which threadedly receives the lower end of a smaller diametered machine screw 72. Screw 72 freely extends through a smooth walled, stepped bore 74 formed through platform 28 and defining an upwardly facing annular shoulder 76. The head of screw 72 is disposed vertically above shoulder 76 to limit upward pivotal deflection of platform 28. The axial distance between the opposed surfaces on the heads of screws 68 and 72 determines the maximum deflection of platform 28 about axis 31. This structure is described in greater detail in the aforesaid copending application Ser. No. 498,156 to which reference is made in the event further details are needed.

When the force measuring instrument of this invention is connected to machinery or systems that produce violent vibrations during operation, a dampening device partially shown in FIGURE 2 and indicated by the reference character 80 may be operatively connected between platform 28 and base 22 for retarding pivotal displacement of the platform about the pivot axis 31. Dampening device 80 preferably is of the same construction as described in the first embodiment which is disclosed in the aforesaid copending application Ser. No. 498,156. Device 80 is selectively adjustable by turning a screw 82 (FIGURE 2) in opposite directions. Reference is made to application Ser. No. 498,156 in the event that a detailed description of dampening device is needed for a full understanding of this invention.

As shown in FIGURES 2, 6, 7, and 8 hinge member 30 consists of a solid, rectangular, heat-treated block of hardened tool steel or other suitable material having flat, parallel front and back surfaces 90 and 91, flat, parallel side surfaces 92 and 93 extending at right angles to surfaces 90 and 91, and parallel, flat top and bottom surfaces 94 and 95 extending at right angles with respect to surfaces 90–93 and interfittingly seating against the opposed flat faces of platform 28 and base 22. Preferably, surfaces 94 are formed on raised ledge portions 98 (see FIGURE 9) extending in parallel relation along the front and back faces of hinge member 30 throughout the entire width of the block. Surfaces 95 are also advantageously formed on the ends of a pair of parallel, raised ledge portions 100 as shown in FIGURE 2. Ledge portions 100 are parallel with and vertically below respective ones of the upper ledge portions 98. Ledge portions 98 and 100 provide for the firm, non-rockable seating engagement of hinge member 30 against the opposed faces of platform 28 and base 22.

As best shown in FIGURE 2, a transverse, cylindrically smooth walled, uniformly diametered bore 102 is formed through an intermediate region of hinge member 30 and opens at opposite ends at surfaces 92 and 93. The longitudinal axis of bore 102 is preferably disposed slightly above a plane passing medially between surfaces 94 and 95. A relatively narrow, open-ended, straight-sided slot 104, formed through one wall region of bore 102, extends inwardly from surface 90 and opens radially into bore 102. Slot 104 extends the entire width of hinge member 30 and is open at surfaces 92 and 93. The center of bore 102 and pivot axis 31 lie in a common plane which medially passes through slot 104 and which substantially contains the longitudinal axes of springs 56–58.

Slot 104 cooperates with bore 102 to form a relatively thin spring flexure section 108 and upper and lower relatively rigid support block sections 109 and 110 which are integrally joined together only by spring section 108. Section 108 is disposed on the side of bore 102 diametrically opposite from slot 104 and extends the entire width of hinge member 30 between side surfaces 92 and 93 as best shown in FIGURE 8. Block sections 109 and 110 respectively define the upper and lower halves of bore 102 and the upper and lower faces of slot 104 which are straight and parallel as best shown in FIGURE 2. The thickness of section 108 is sufficiently thin that it will yieldably flex when a load or force moment is applied to platform 28. The thickness of section 108 determines the lower limit of the load range of the instrument.

Figure 7:
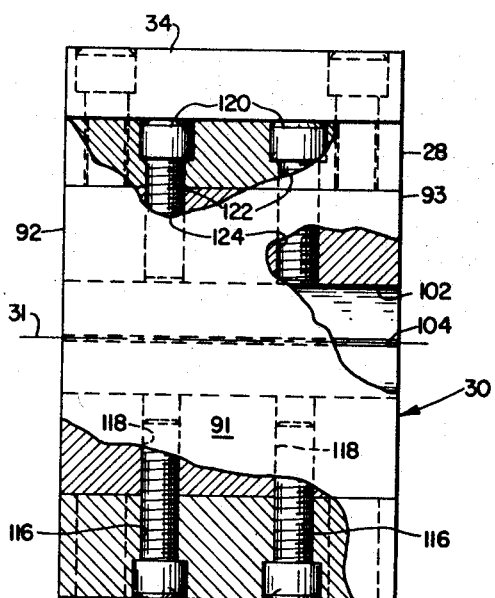
FIGURE 7 is a partially sectioned, right-hand end elevation of the force measuring instrument as viewed from FIGURE 2.

As best shown in FIGURES 2 and 7, hinge member 30 is fixed to base 22 by a plurality of machine screws 114. Screws 114 extend upwardly through parallel, smooth walled bores 116 in base 22 and are threaded at their upper ends into aligning tapped bores 118. Bores 118 are formed through section 110 and transversely open into bore 102. The longitudinal axes of bores 118 are contained in a common plane which is offset slightly forwardly of the longitudinal axis of bore 102 and which normally intersects the common plane passing through pivot axis 31, the longitudinal axis of bore 102 and slot 104. Bores 116, which are formed through base 22, are laterally spaced apart by a distance equal to the lateral spacing between bores 118 to thus axially align with bores 118 when hinge member 30 is seated and positioned on base 22. As shown, screws 114 are made sufficiently short that their upper ends terminate intermediate the opposite ends of their respective bores 118.

Still referring to FIGURES 2 and 7, a plurality of machine screws 120 are provided for securing platform 28 on hinge member 30. Screws 120 extend through parallel bores 122 in platform 28 and are threaded into parallel tapped bores 124 which are formed through section 109. Each bore 124 opens at its inner end transversely into bore 102 and axially aligns with a respective one of bores 118. The longitudinal axes of bores 118 and 124 are thus contained in a common plane normally intersecting the plane containing the center of bore 102 and pivot axis 31. Bores 122, which are formed through platform 28, are spaced laterally apart by a distance equal to the lateral spacing between bores 124 to thus align with bores 116 and also with bores 124 when platform 28 is seated and positioned on the top face of hinge member 30.

As best shown in FIGURE 2, the opposing faces of sections 109 and 110 which define slot 104 are spaced vertically apart by a sufficient clearance distance to permit the free end of platform 28 to be deflected about pivot axis 31 by application of a force to platform 28 in a direction extending transversely of the pivot axis. Axis 31, which is defined by spring section 108, extends laterally of platform 28 and normally intersects the longitudinal flexure axis defined on hinge member 30 along surface 91.

In the position of parts shown in FIGURE 2, hinge member 30 is unflexed, and platform 28 and base 22 are disposed in substantially parallel relationship with each other. By applying a load to platform 28, spring section 108 is flexed in the region of pivot axis 31 to allow platform 28 to pivot about axis 31.

The dimensions and material requirements of hinge member 30 are selected in accordance with the range of forces to be measured to provide, as an example, an angular deflection range of about ten minutes and to assure that the maximum and minimum deflecting forces to be encountered in use will fall within the elastic limits of the material. The force-imparted pivotal deflection of platform 28 will yieldably be resisted by flexure section 108 and assembly 54 which act in the manner of a leaf spring to bias platform 28 toward the position shown in the drawings. Increasing the thickness of section 108 increases the resistance of section 108 to pivotal displacement of platform 28. Decreasing the thickness of section 108, on the other hand, lessens the resistance to pivotal deflection of the platform.

It will be appreciated that the magnitude of linear motion imparted to armature 40 and thus the magnitude of the signal generated at the terminals of winding 50 depends upon the effective lever arm distance extending normally between pivot axis 31 and the platform region along section lines 4—4 where linkage 38 is connected to platform 28. Increasing and decreasing this lever arm length will respectively increase and decrease the magnitude of linear motion imparted to armature 40. In FIGURE 2, section 108 is shown to be spaced rearwardly of the aligned axes of screws 114 and 120 such that slot 104 faces the free deflectible end of the platform. The lever arm length will therefore be measured from a vertical plane containing axis 31 to a vertical plane which is coincident with section lines 4—4.

Owing to the novel construction of hinge member 30 and the arrangement of this hinge member with respect to base 22 and platform 28 and the mounting means comprising screws 114 and 120, the effective lever arm length, which will affect the sensitivity of the instrument, can selectively be adjusted simply by repositioning hinge member 30 in the manner shown in FIGURE 10. There, hinge has been turned through an angle of 180° to be reversely oriented with respect to the position shown in FIGURE 2. Thus, in the position shown in FIGURE 10, section 108 and, consequently, pivot axis 31 is positioned forwardly of the aligned axes of screws 114 and 120 with slot 104 facing in the opposite direction from the free, deflectible end of platform 28. In the position of FIGURE 10, therefore, the effective lever arm length will be shortened substantially by the thickness of hinge member 30 between surfaces 90 and 91.

To accomplish this change in the effective lever arm length, screws 114 and 120 are removed and hinge member 30 is turned from the FIGURE 2 position through 180° to the FIGURE 10 position and properly located to again align bores 118 and 124 with bores 116 and 122 respectively. Screws 114 and 120 are then threaded into their respective bores to secure hinge member 30 to base 22 and platform 28 in its FIGURE 10 position. It is clear from the foregoing description that bores 118 and 124 are required to align with bores 116 and 122 in either the position shown in FIGURE 2 or the position shown in FIGURE 10 to effect the selective change in the lever arm length of the force receiving platform.

From the foregoing, it is clear that the spring hinge structure of this invention consists of one part which is secured to platform 28 and base 22 by a minimum number of screws. Compared with the multiplicity of parts used to make up the spring hinge assemblies in the aforesaid copending applications and also in the patents mentioned therein, the hinge structure of this invention is easier to assemble and disassemble, reduces overall manufacturing costs, and is reversible without modifying the construction of the force measuring instrument to selectively vary the lever arm length along which platform 28 acts to transmit motion to armature 40.

The force measuring instrument illustrated in FIGURES 11-14 is similar to the embodiment just described except that the range adjustment spring assembly 54 has been omitted. To the extent that the embodiment shown in FIGURES 11-14 is the same or similar to the embodiment illustrated in FIGURES 1-10, like reference numerals suffixed by the letter "a" have been applied to designate similar parts in this second embodiment.

As shown in FIGURES 11-14, the force measuring instrument 20a is more compact and simplified as compared with the embodiment shown in FIGURES 1-10. Hinge member 30a, which mounts platform 28a on base 22a is the sole flexure spring resisting pivotal displacement of the platform by forces applied thereto.

To alter the effective lever arm length along which platform 28a acts to transmit motion to linkage 38a, hinge member 30a may be turned 180° to its reversely oriented position shown in FIGURE 15 in the same manner described in the first embodiment. If it is desired to replace hinge member 30a with one having a different spring flexure section thickness to provide a different operating range, screws 114a and 120a are first loosened and platform 28a is then jacked up by unthreading screw 68a. Hinge member 30a then can be replaced.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A force measuring instrument comprising a platform for receiving a force to be measured, a relatively fixed support base, a flexure hinge member disposed between said base and said platform for yieldably pivotally mounting said platform on said base, said member being formed with a transverse hole extending through an intermediate portion of said member and an open-ended slot opening radially into said hole to provide (a) a relatively thin flexure spring section on the side of said hole diametrically opposite said slot and (b) opposed relatively rigid sections respectively engaging opposed surfaces on said base and said platform and being integrally joined together only through said spring section, said spring section being flexed by forces applied to said platform to provide for the pivotal deflection of said platform about a transverse axis lying between said platform and said base and in a plane passing through said slot and the center of said hole, means operatively connected to said platform at a region laterally spaced from said axis for sensing and converting the deflection of said platform into an output signal, and means for fixing said member to said base and said platform alternatively in 180 degree spaced apart, reversely oriented positions where said slot respectively opens toward and away from said region to provide different lever arm lengths between said axis and said region for varying the magnitude of platform deflection for a given value of force applied to said platform.

2. The force measuring instrument defined in claim 1 wherein said means fixing said member to said base and said platform consists of a plurality of fastening elements having longitudinal axes lying only in a plane which extends at right angles with respect to said base and said platform when said platform is positioned parallel to said base.

3. The force measuring instrument defined in claim 1 wherein said means fixing said member to said base and said platform comprises axial aligned threaded members respectively disposed on said base and said platform and being threaded into axially aligned, tapped bores in said rigid sections when said member is in either of said reversely oriented positions, the longitudinal axes of said bores lying in a common plane perpendicularly intersecting a plane passing through said pivot axis and the longitudinal axis of said hole, said member being turnable between said positions about an axis extending parallel to the longitudinal axes of said bores, and said bores axially aligning with said threaded members in either of said positions.

4. A force measuring instrument comprising a platform for receiving a force to be measured, a relatively fixed support base, a flexure hinge member disposed between said base and said platform for yieldably pivotally mounting said platform on said base, said member being formed with a transverse hole extending through an intermediate portion of said member and an open-ended slot opening radially into said hole to provide (a) a relatively thin flexure spring section on the side of said hole diametrically opposite said slot and (b) a pair of opposed relatively rigid sections respectively engaging opposed surfaces on said base and said platform and being integrally joined together only through said spring section, means securing said platform and said base to said rigid sections, said spring section being flexed by forces applied to said platform to provide for the pivotal deflection of said platform about a transverse axis lying between said platform and said base and in a plane passing through said slot and the center of said hole, a linkage connected to said platform at a region spaced from said axis for transmitting the force-imparted deflection of said platform, and means connected to said linkage for converting the transmitted deflection of said platform into an electrical signal which is representative of the deflection, said hinge member being formed at oppositely facing ends of said rigid sections with raised ledge portions which separably seat against said opposed surfaces of said base and said platform to provide for a non-rockable seating engagement of said member against said opposed surfaces.

5. The force measuring instrument defined in claim 4 there being a pair of said ledge portions at the end of each of said rigid sections, and each pair of ledge portions being arranged in parallel spaced relation and extending longitudinally with respect to said axis.

References Cited

UNITED STATES PATENTS

| | | | |
|---|---|---|---|
| 3,261,204 | 7/1966 | Jacobsen | 73—141 |
| 3,195,353 | 7/1965 | Pien | 73—398 |
| 2,981,100 | 4/1961 | Johnson | 73—141 |

RICHARD C. QUEISSER, Primary Examiner

J. WHALEN, Assistant Examiner

U.S. Cl. X.R.

177—210